United States Patent
Malegaonkar et al.

(10) Patent No.: US 10,152,548 B2
(45) Date of Patent: Dec. 11, 2018

(54) LOCATING MOBILE USERS

(71) Applicant: Cisco Technology, Inc., San Jose, CA (US)

(72) Inventors: Ashutosh A. Malegaonkar, Milpitas, CA (US); Mofei Qian, Shanghai (CN); Rizhi Chen, Shanghai (CN); Li Kang, Shanghai (CN); Wael Kamel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 20 days.

(21) Appl. No.: 15/176,968

(22) Filed: Jun. 8, 2016

(65) Prior Publication Data

US 2016/0360028 A1 Dec. 8, 2016

Related U.S. Application Data

(60) Provisional application No. 62/172,385, filed on Jun. 8, 2015.

(51) Int. Cl.
  *G06F 17/30* (2006.01)
  *H04W 60/04* (2009.01)
  (Continued)

(52) U.S. Cl.
  CPC .... *G06F 17/30867* (2013.01); *G06F 17/3087* (2013.01); *H04L 67/18* (2013.01);
  (Continued)

(58) Field of Classification Search
  CPC . H04M 1/72572; H04W 4/023; H04W 60/04; G06F 17/30867
  See application file for complete search history.

(56) References Cited

U.S. PATENT DOCUMENTS 6,716,101 B1 4/2004 Meadows et al.
8,571,580 B2 10/2013 Altman et al.
(Continued)

OTHER PUBLICATIONS

Georgiev, et al., "Location Based Mobile Application to Support Educational Process", International Conference on e-Learning, '14; pp. 118-124.

(Continued)

*Primary Examiner* — Marisol Figueroa
(74) *Attorney, Agent, or Firm* — Parker Ibrahim & Berg LLP; James M. Behmke; Stephen D. LeBarron

(57) ABSTRACT

In one embodiment, respective user devices may be registered for one or more particular users at a particular physical space, and each of the one or more particular users may be associated with a respective user profile. The system monitors a location of each of the particular users within the particular physical space based on a corresponding location of the respective user device, such that upon receiving a search query for a particular type of user within the particular physical space, and determining one or more resultant users that correspond to the particular type of user based on the associated respective user profiles, the system can determine a location of the one or more resultant users. As such, the system can display, on a graphical user interface (GUI), the location of the one or more resultant users on a virtualized map of the particular physical space.

18 Claims, 8 Drawing Sheets

(51) Int. Cl.
*H04L 29/08* (2006.01)
*H04W 4/02* (2018.01)

(52) U.S. Cl.
CPC .......... *H04L 67/306* (2013.01); *H04W 4/023* (2013.01); *H04W 60/04* (2013.01)

(56) References Cited

U.S. PATENT DOCUMENTS

| | | | |
|---|---|---|---|
| 2006/0001544 A1* | 1/2006 | Siefke | G08B 13/2417 340/572.4 |
| 2008/0067244 A1* | 3/2008 | Marks | G01V 15/00 235/385 |
| 2010/0267399 A1* | 10/2010 | Sweeney | G06Q 10/10 455/456.3 |
| 2013/0324166 A1 | 12/2013 | Mian et al. | |
| 2014/0039945 A1* | 2/2014 | Coady | G06Q 10/02 705/5 |
| 2015/0181379 A1 | 6/2015 | Pai et al. | |
| 2015/0327038 A1* | 11/2015 | Sooriyan | H04L 67/22 705/319 |
| 2016/0110830 A1* | 4/2016 | Shapira | G06Q 50/184 705/26.43 |
| 2016/0234651 A1* | 8/2016 | Marcus | G06Q 50/01 |
| 2016/0321337 A1* | 11/2016 | Lee | G06Q 10/06 |

OTHER PUBLICATIONS

Wee, et al., "Physical Space Map Overlay and Interaction for an Internet of Things Integrated Developer Environment", U.S. Appl. No. 62/172,466, filed Jun. 8, 2015, 50 pages, U.S. Patent and Trademark Office, Alexandria, VA.

"What is iBeacon? A Guide to Beacons", iBeaconInsider, iBeacon News Everyday, http://www.ibeacon.com/what-is-ibeacon-a-guide-to-beacons/, printed Oct. 19, 2015, 5 pages, (1995) Not Affiliated with Apple, Inc.

* cited by examiner

LOCATING MOBILE USERS

RELATED APPLICATION

The present application claims priority to U.S. Provisional Appl. No. 62/172,385, filed on Jun. 8, 2015 for LOCATING MOBILE USERS, by Malegaonkar, et al., the contents of which are hereby incorporated by reference.

TECHNICAL FIELD

The present disclosure relates generally to computer networks, and, more particularly, to locating mobile users.

BACKGROUND

In recent years, a myriad of mobile devices have been developed. For example, cellular phones, laptop computers, tablet devices, etc. have all gained increasing use over the past several decades. More recent examples of mobile devices include wearable devices, such as smart watches, wearable body sensors, heads-up displays (HUDs), and the like.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, techniques are provided herein that allow the rapid locating of an individual within a particular location. In particular, in one embodiment, respective user devices may be registered for one or more particular users at a particular physical space, and each of the one or more particular users may be associated with a respective user profile. The system monitors a location of each of the particular users within the particular physical space based on a corresponding location of the respective user device, such that upon receiving a search query for a particular type of user within the particular physical space, and determining one or more resultant users that correspond to the particular type of user based on the associated respective user profiles, the system can determine a location of the one or more resultant users. As such, the system can display, on a graphical user interface (GUI), the location of the one or more resultant users on a virtualized map of the particular physical space.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
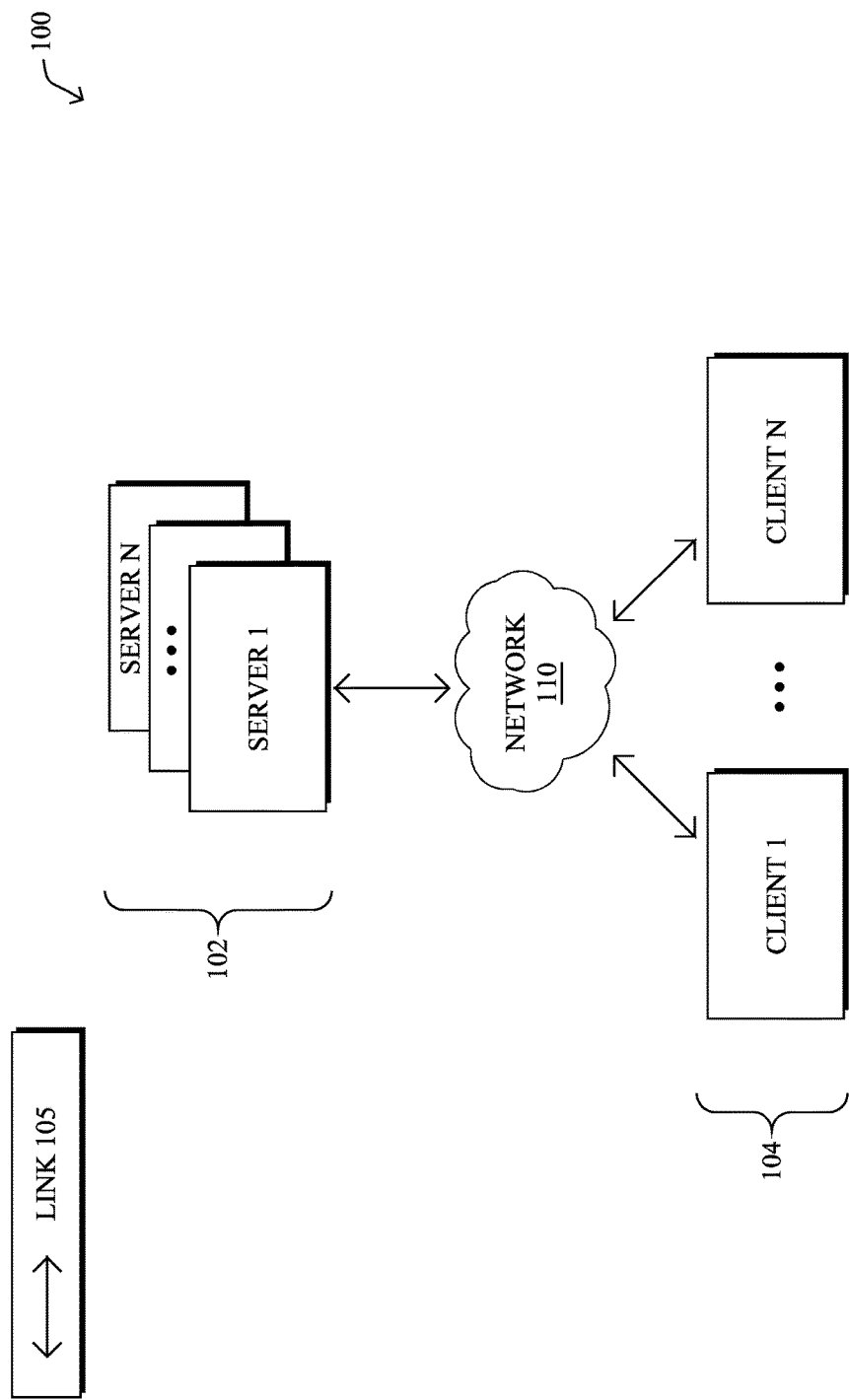
FIG. 1 illustrates an example computer system.

FIG. 1 is a schematic block diagram of an example computer system 100 illustratively comprising any number of servers 102 (e.g., a first through $n^{th}$ server) that communicate with any number of client devices 104 (e.g., a first through $n^{th}$ client) via a network 110. In general, servers 102 provide some form of computerized service to client devices 104. Such a service may be either on a pull basis (e.g., in response to receiving a request from one of client devices 104 for the service) or on a push basis (e.g., data is sent to one of client devices 104 by one of servers 102 without first receiving a request for the service).

Network 110 may include any number of networking devices (e.g., routers, switches, intermediary servers, etc.) that facilitate communications between servers 102 and client devices 104. For example, network 110 may include, but is not limited to, a LAN, WAN, wireless network, hardwired network, optical network, satellite network, combinations thereof, or the like. In addition, network 110 may employ any number of different communication protocols such as the Internet Protocol (IP), Multiprotocol Label Switching (MPLS), etc., that allow packets to be routed between servers 102 and client devices 104 via network 110.

Links 105 may provide communication media for servers 102, client devices 104, and/or between the devices of network 110. Links 105 may comprise wired and/or wireless links. Example wireless links may include, but are not limited to, WiFi links, radio links, near field communication links, cellular links, satellite links, or the like. Example wired links may include, but are not limited to, fiber optic links, coaxial cabling, Ethernet or other data network cabling, etc.

Figure 2:
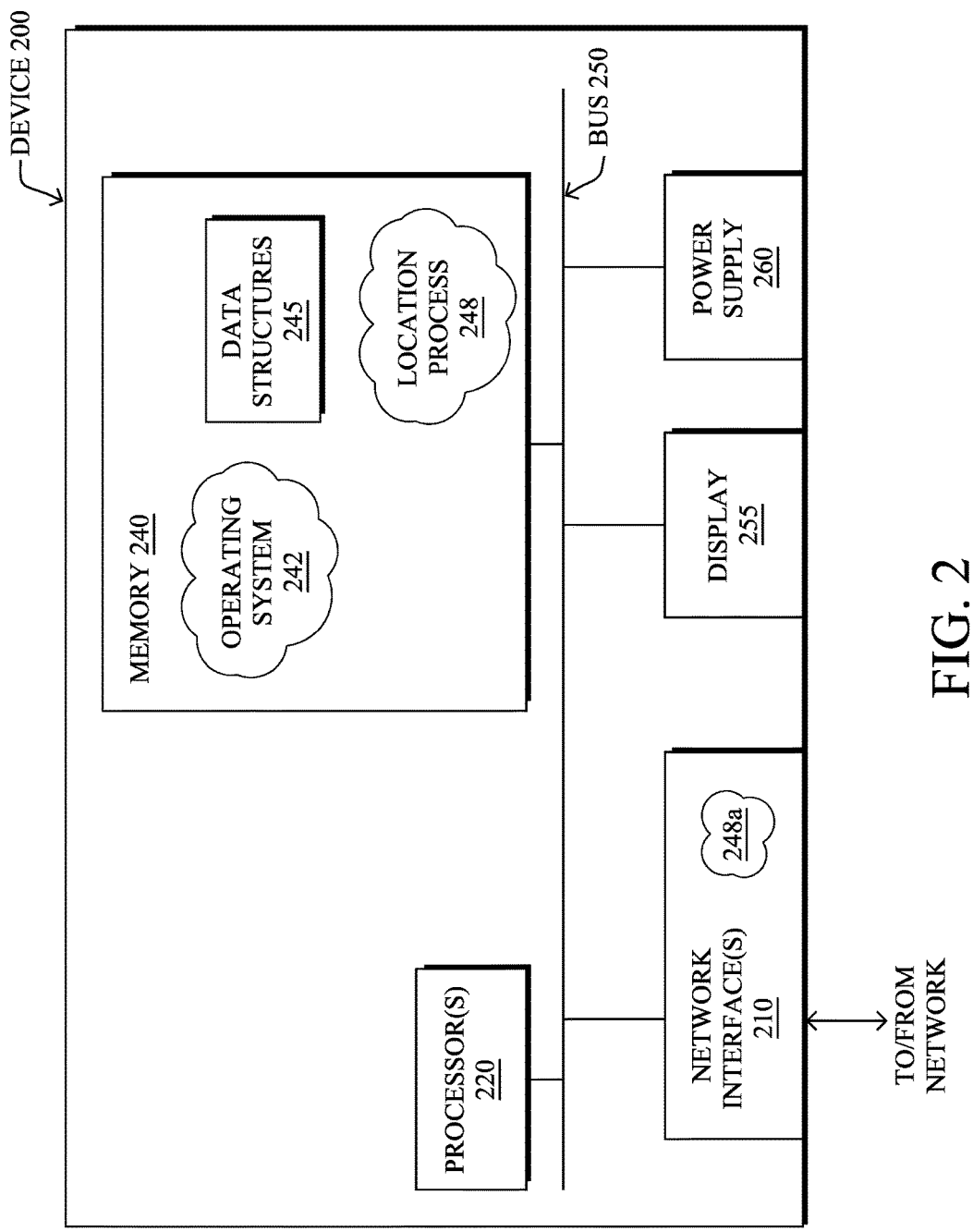
FIG. 2 illustrates an example network device/node.

FIG. 2 is a schematic block diagram of an example device 200 that may be used with one or more embodiments described herein, e.g., as any of the devices described with reference to FIG. 1 above. The device may comprise one or more network interfaces 210 (e.g., wired, wireless, etc.), an electronic display 255, at least one processor 220, and a memory 240 interconnected by a system bus 250 and powered by a power supply 260 (e.g., battery, plug-in, etc.).

The network interface(s) 210 include the mechanical, electrical, and signaling circuitry for communicating data over links 105 coupled to the network 110. The network interfaces may be configured to transmit and/or receive data using a variety of different communication protocols. Note, further, that the nodes may have two different types of network connections 210, e.g., wireless and wired/physical connections, and that the view herein is merely for illustration.

Display 255 may be of any form of electronic display operable to convey visual information to a user. In some embodiments, display 255 may be integral to device 200. For example, if device 200 is a portable electronic device (e.g., a cellular phone, a tablet, a laptop, a smart watch or other wearable electronic device, etc.), display 255 may be built into the housing of device 200. In other embodiments, display 255 may be non-integral to device 200. In such cases, device 200 may provide visual data to display 255 via a wired or wireless connection (e.g., a serial cable, an HDMI cable, a wireless link, etc.).

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise a location process 248, as described herein. Note that while process 248 is shown in centralized memory 240, alternative embodiments provide for the process to be specifically operated within the network interfaces 210, such as a component of a MAC layer ("248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, the use of portable electronic devices has grown considerably in recent years. However, locating other people remains challenging. For example, people may move around within a particular location (e.g., at a conference, at a networking event, etc.), making it difficult to locate a person of interest. Such a person of interest may be a specific person, a person having a set of attributes (e.g., the person is an expert in a particular field, etc.), or the like.

Locating Mobile Users

The techniques herein allow the use of mobile devices to be leveraged, to facilitate the locating of particular individuals in an area. In some aspects, information regarding the individuals and a depiction of the area may be provided to a user interface (e.g., via an electronic display).

Specifically, according to one or more embodiments of the disclosure, techniques are provided herein that allow the rapid locating of an individual within a particular location. In particular, in one embodiment, respective user devices may be registered for one or more particular users at a particular physical space, and each of the one or more particular users may be associated with a respective user profile. The system monitors a location of each of the particular users within the particular physical space based on a corresponding location of the respective user device, such that upon receiving a search query for a particular type of user within the particular physical space, and determining one or more resultant users that correspond to the particular type of user based on the associated respective user profiles, the system can determine a location of the one or more resultant users. As such, the system can display, on a graphical user interface (GUI), the location of the one or more resultant users on a virtualized map of the particular physical space.

Illustratively, the techniques described herein may be performed by hardware, software, and/or firmware, such as in accordance with the location process 248 shown in FIG. 2, which may include computer executable instructions executed by the processor 220 (or independent processor of interfaces 210) to perform functions relating to the techniques described herein.

Figure 3:
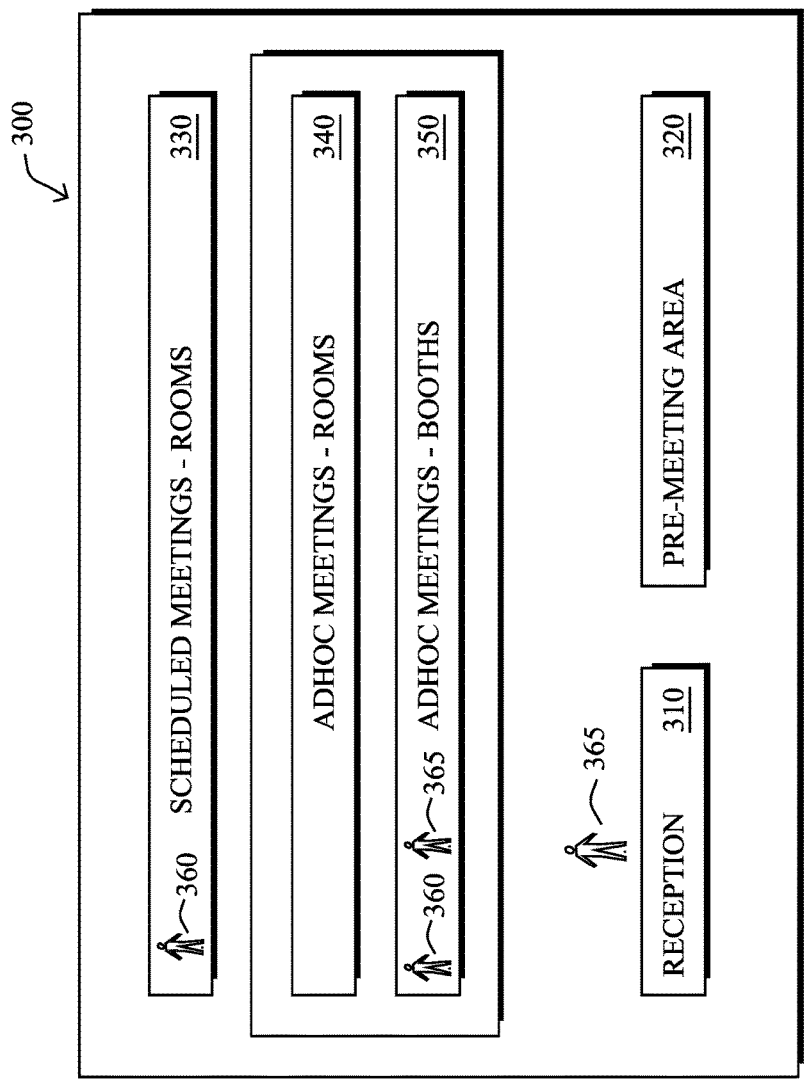
FIG. 3 illustrates an example location.

An example floor plan for a location/area is shown in FIG. 3. As shown, assume that the location 300 corresponds to a hall in which a convention is being held. The hall may include any or all of the following sub-areas: 1.) a reception area 310 at which attendees may register or otherwise check in, 2.) a pre-meeting area 320 (e.g., a holding area where individuals may wait until a meeting is scheduled, etc.), 3.) a set of rooms 330 in which meetings are scheduled, 4.) a set of rooms 340 designated for ad-hoc meetings, and/or 5.) a set of booths 350 designated for ad-hoc meetings. For sake of illustration, also assume that certain attendees 360 are considered experts that other attendees 365 may wish to locate. In other words, the location or a portion of the location may be designated a meet-the-expert (MTE) area, to allow attendees to find and converse with the designated experts.

Figure 4:
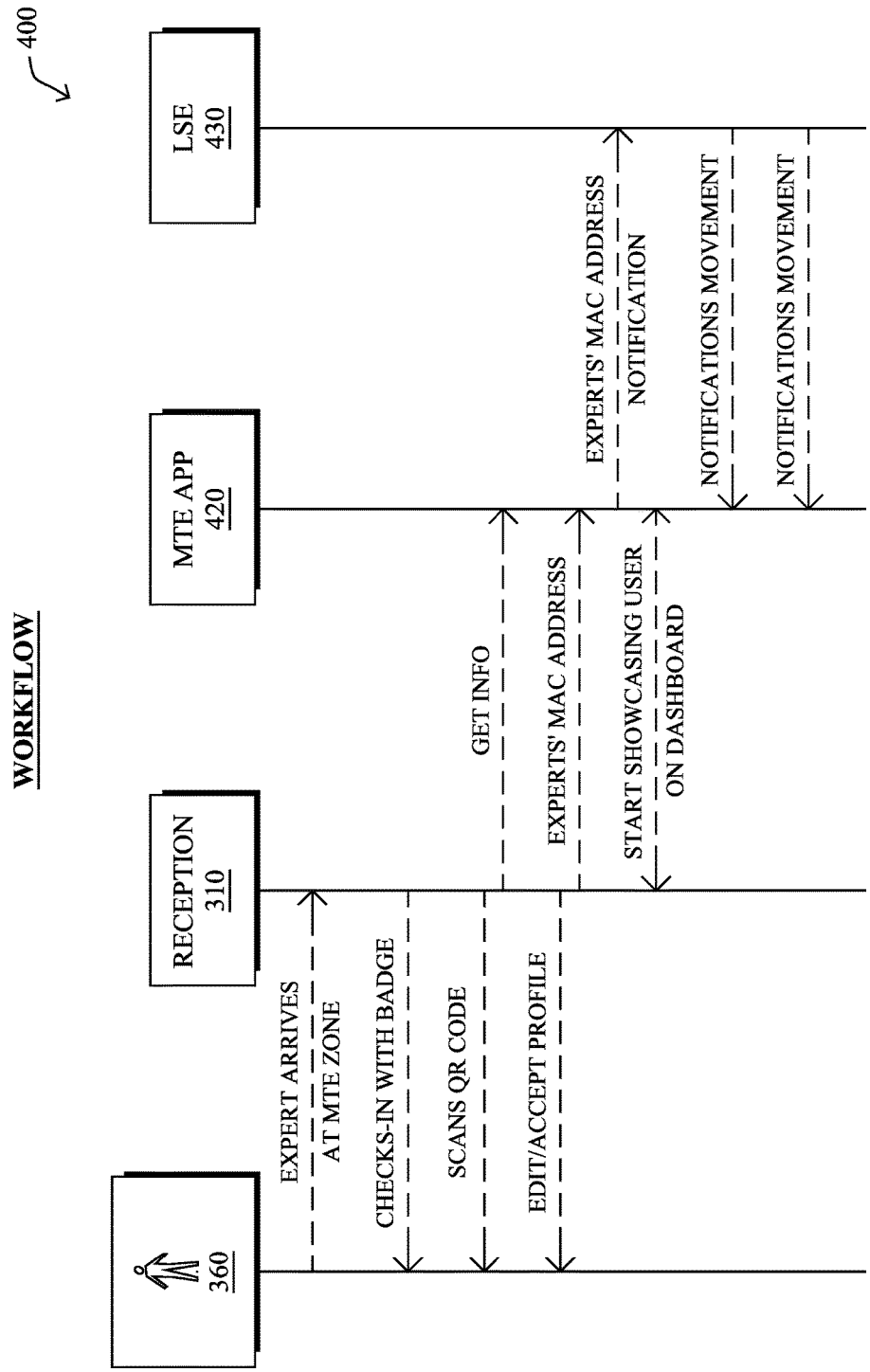
FIG. 4 illustrates an example workflow for providing location services.

Operationally, an example workflow 400 to locate an expert is shown in FIG. 4, in various embodiments. As shown, a given expert 360 may check in at a reception area 310 (e.g., via a kiosk, by providing information to a human receptionist, etc.). In general, checking in may entail the user proving his or her identity and confirming his or her profile with a "meet-the-expert" (MTE) application 420. For example, the expert may scan or otherwise present a badge or other form of identification (e.g., a QR code, etc.). In response, a profile associated with the expert may be retrieved from the MTE app (e.g., the name of the expert, the area of expertise of the expert, etc.) and presented to the expert for confirmation.

In various embodiments, during registration, the expert may also register one or more mobile devices to be carried by the expert during the event. In one embodiment, the entire check in and device registration processes may be performed by the mobile device being registered. For example, the expert may operate a mobile application (e.g., location process 248, etc.), to complete the check in process. As part of the device registration, a device identifier may be associated with the profile of the expert and used to track the location of the expert during the event (e.g., by a location services engine (LSE) 430). For example, in one embodiment, the device identifier may be the media access control (MAC) address of the device.

Notably, in one embodiment herein, the registering user may scan a QR code from his or her mobile device as part of the registration. The QR code may initiate a registration app/process on the device for the user to register and/or confirm his/her profile, but it may also be used to associate the device to the user, and to identify the device. For instance, using a newly defined exchange protocol, the QR code (or other scanned object/image) may initiate an exchange for the MTE app 420 to obtain the MAC address (or other device identifier) from the user's mobile device.

In one embodiment, the location of an expert or other individual may be tracked within the location using a WiFi-based locating service, such as CMX by Cisco Systems, Inc. or a similar mechanism (e.g., based simply on WiFi access point connectivity, or more specifically based on triangulation using signal strength, transmission delays, etc.). In other words, as the individual moves from one physical location to the other, they system may detect the movement of the corresponding device identifier that is associated with the user's profile. For example, the system may employ movement notification APIs, to indicate movements of the device and corresponding user. Other location services, such as GPS or others (e.g., cellular proximity, cellular triangulation, etc.) may also be suitable, depending on particular location (e.g., indoors, outdoors, etc.), and particular accuracy desired by the location system herein.

As would be appreciated, the location tracking may be limited in some cases, to particular zones within the area, either based on the range or location of the location-determining hardware (e.g., WiFi points, etc.) or via software. For example, the system may not track individuals or otherwise present information about an individual's location, if the individual is within a predefined range of a bathroom or other blackout area.

Figure 5:
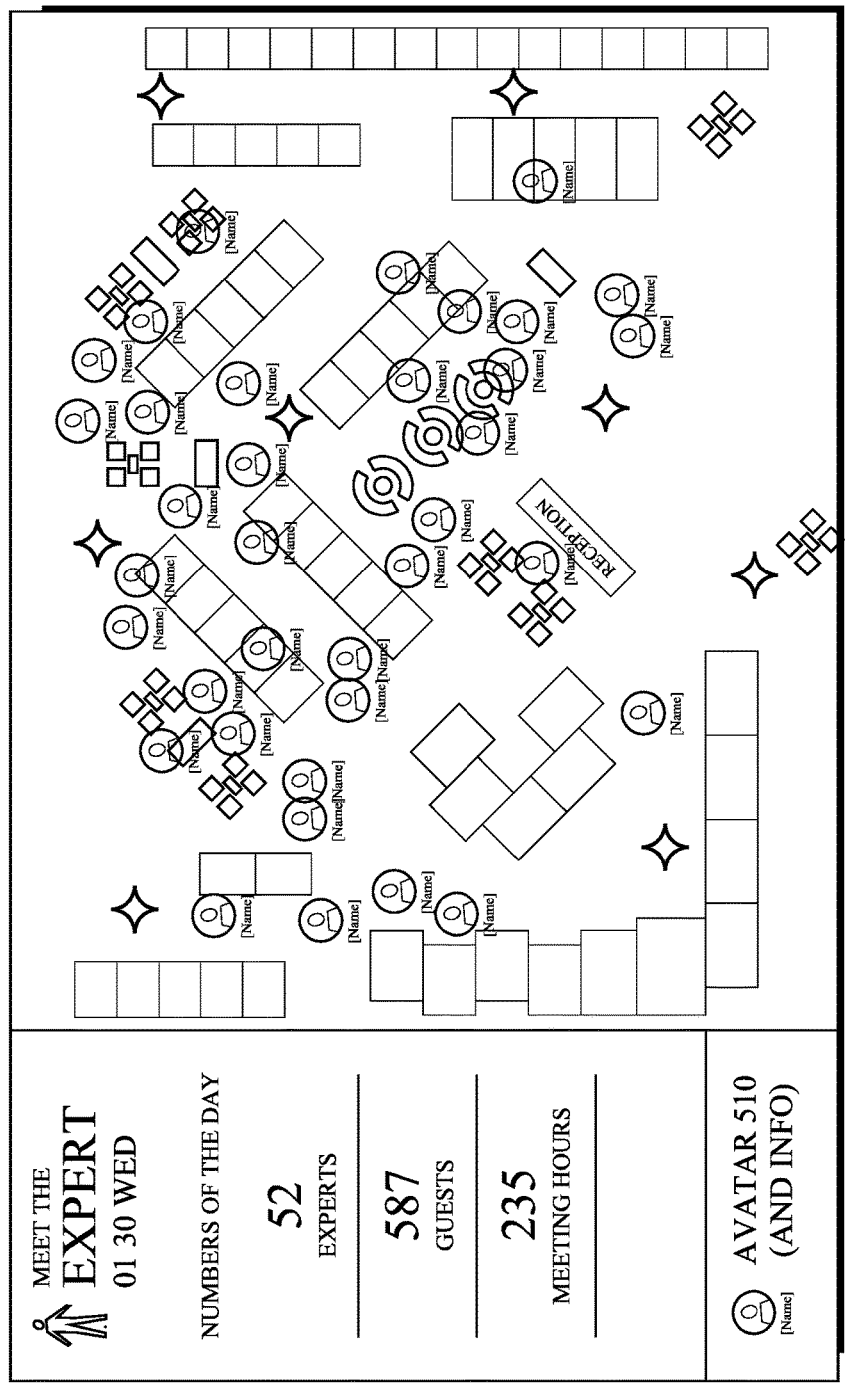
FIG. 5 illustrates an example user interface on an electronic display.

FIG. 5 illustrates an example user interface 500 that may be generated and presented on an electronic display, in accordance with the techniques herein. As shown, user avatars 510 or other icons may be displayed in conjunction with a map of the location, which may have one or more objects, defining features (e.g., walls, rooms, etc.), as well as any other information deemed appropriate for the given interface. For example, the corresponding avatar or other icon associated with a particular expert may be displayed at a location on a map that corresponds to the detected location of the expert. Any number of different types of information from the individual's profile may be displayed. For example, the individual's picture, name, area of expertise, availability, etc., may be displayed as part of the interface. The interface may also present analytics such as the number of registered experts, the total number of meeting minutes, heat maps for occupied rooms, etc. The interface may also be interactive, thereby allowing the user to zoom in or out of a particular sub-area or focus on a particular individual (e.g., to view additional information about the individual).

Figure 6:
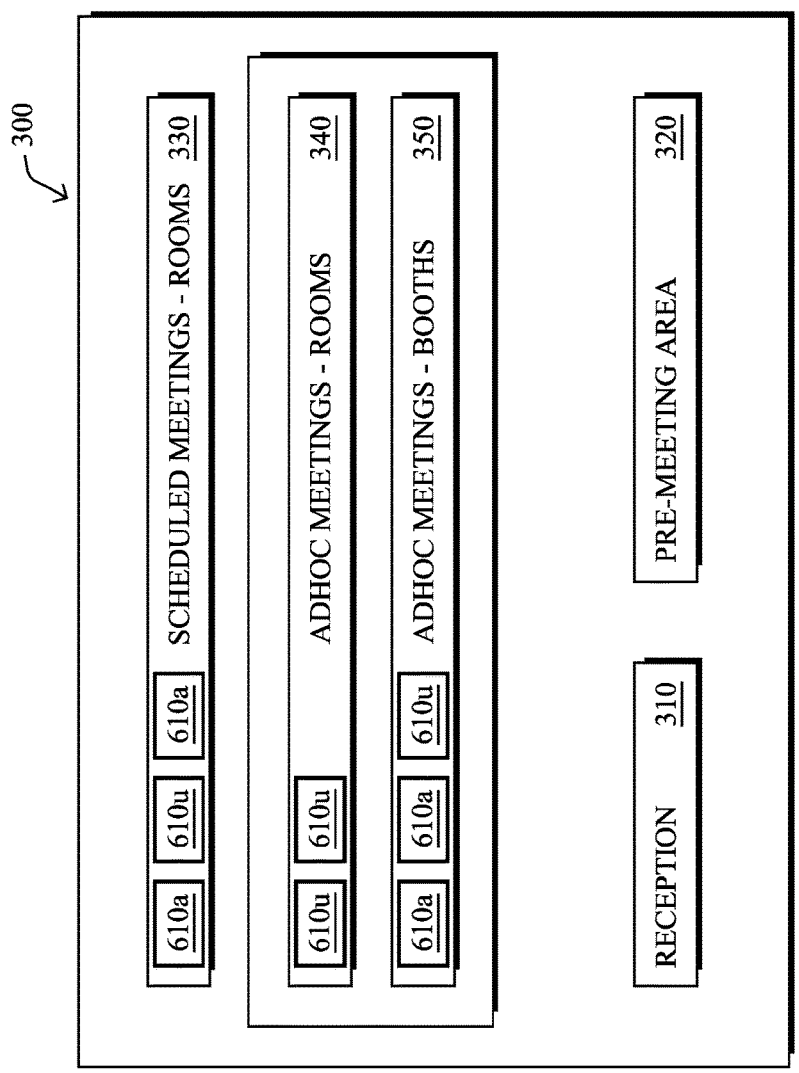
FIG. 6 illustrates an example display of sub-area availability.

In one embodiment, as illustrated in FIG. 6, sensor data and/or the gathered location data from the mobile devices may be used by the system to determine whether or not a given sub-area 610 is in use. For example, the system may determine whether a given meeting room is in use and present the usage information as part of the displayed interface. Such information may also be used by the system to dynamically schedule and/or move meetings, based on the collected room availability information (e.g., available sub-areas 610*a*, unavailable sub-areas 610*u*, etc.). Such techniques may be expanded into other realms, such as determining crowded spaces within open exposition centers, redirecting user traffic around such crowded spaces, and so on.

Figure 7:
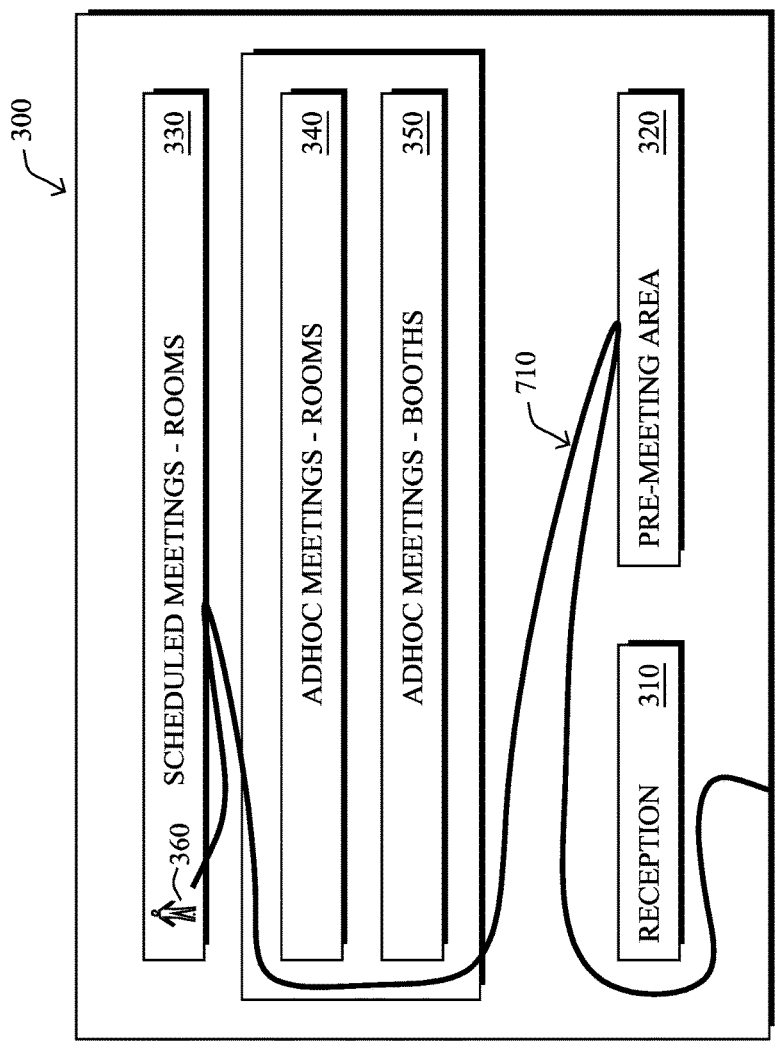
FIG. 7 illustrates an example user path tracking.

In another embodiment, the interface may display a spaghetti diagram that displays the path movement of the tracked individuals. For example, as shown in FIG. 7, the system may show a history of a user's detected locations at once along a given tracked path 710. Such information, in some cases, may be used to fine-tune a process (e.g., the paths traversed in an industrial setting, user traffic redirection, etc.).

Figure 8:
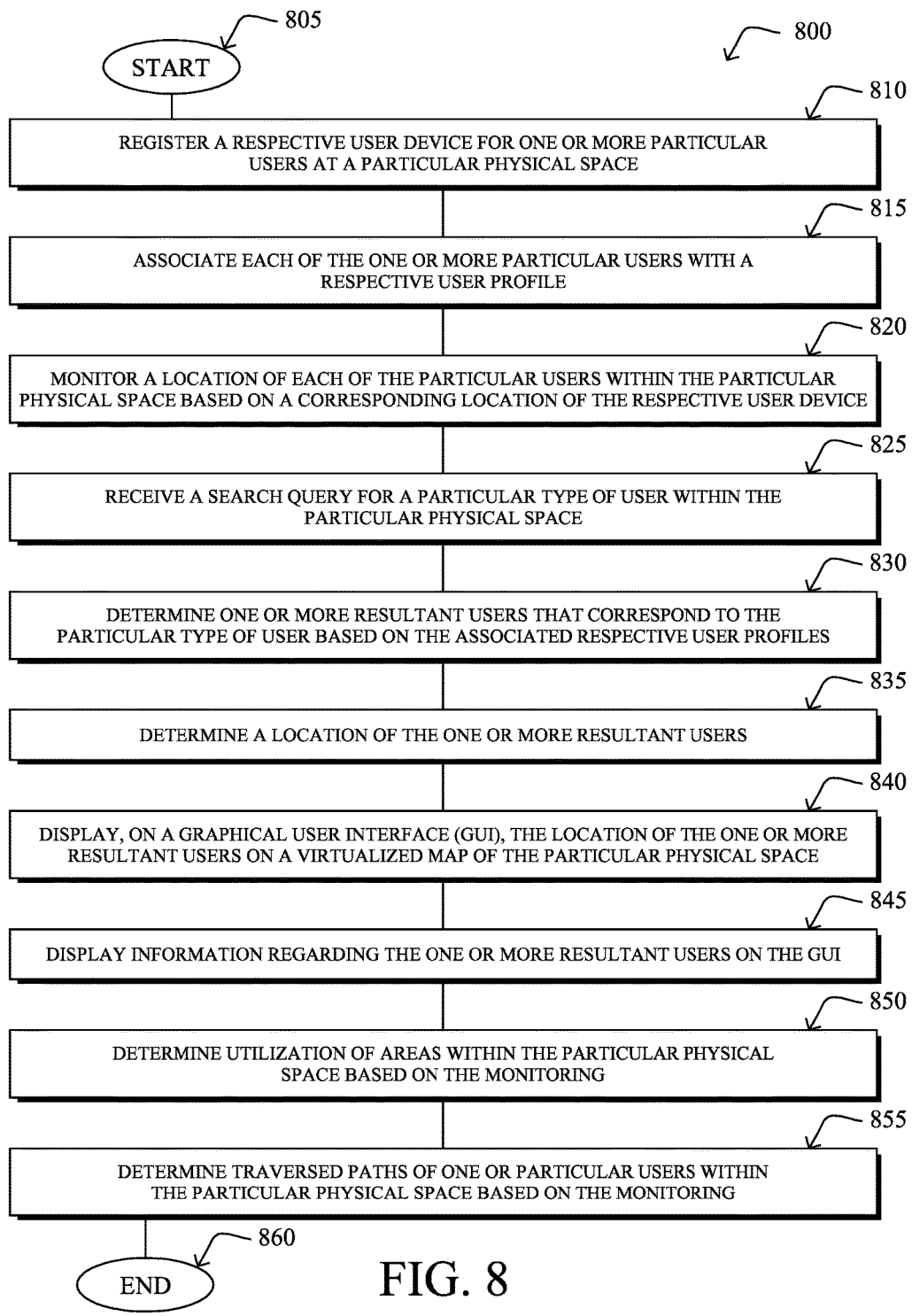
FIG. 8 illustrates an example procedure for locating mobile users.

FIG. 8 illustrates an example simplified procedure for locating mobile users in accordance with one or more embodiments described herein. The procedure 800 may start at step 805, and continues to step 810, where, as described in greater detail above, respective user devices (e.g., a phone, tablet, laptop, radio frequency identification (RFID) tag, etc.) for one or more particular users may be registered at a particular physical space. For example, as mentioned, registering can occur at a particular event at the physical space, and user devices may be identified based on a media access control (MAC) address or other identifying information (e.g., application ID, user ID, etc.).

In step 815, each of the one or more particular users may be associated with a respective user profile, such as based on QR-code scanning by one or more particular user devices, or even based on attendance of the respective user at a previous event.

In step 820, the system monitors a location of each of the particular users within the particular physical space based on a corresponding location of the respective user device (e.g., communicating with location-based services of one or more respective registered user devices (GPS, WiFi, etc.) to determine a physical location of the one or more respective registered user device). As noted above, monitoring may be limited within certain areas of the particular physical space, or else based on a user-defined level of detectability (e.g., "track me now", "do not track me now", "do not track me outside of the conference center", and so on).

In step 825, according to the techniques herein, the system may receive a search query for a particular "type" of user within the particular physical space, where the type may be users with a particular skill set, knowledge base, experience level, expertise, job, position, company, provided service, price rate, etc. Notably, in certain configurations, the "type" of user may specifically be an identity of one or more users, or else requesting information on all registered users within the physical space. Accordingly, in step 830, the system can determine one or more resultant users that correspond to the particular type of user based on the associated respective user profiles, and may thus determine a location of the one or more resultant users in step 835.

In step 840, a graphical user interface (GUI) is used to display the location of the one or more resultant users on a virtualized map of the particular physical space, where optionally, in step 845, information regarding the one or more resultant users may also be displayed on the GUI (e.g., a user name, user profile, user picture, a user availability, etc.).

As mentioned above, in certain embodiments, the system may be used to determine utilization of areas within the particular physical space based on the monitoring in step 850, and also to determine traversed paths of one or particular users within the particular physical space based on the monitoring in step 855.

The example simplified procedure 800 illustratively ends in step 860, though notably the procedure may continue from any of the above-mentioned steps, such as continuing to register and track users, display movement, update availability, etc.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the display of collected location information for users within a given area. In particular, the techniques herein simplify the process of locating users in a given location, such as at a conference or event, or even on a campus (work or school campuses), or perhaps even limitless boundaries of spaces (e.g., international "where are they" mappings of particular users and/or experts).

While there have been shown and described illustrative embodiments that provide for location tracking, it is to be understood that various other adaptations and modifications may be made within the spirit and scope of the embodiments herein. For example, the embodiments have been shown and described herein primarily with respect to certain configurations. However, the embodiments in their broader sense are not as limited, and may, in fact, be used with other types of networks and/or protocols (e.g., other location-determining mechanisms, etc.). Further, while the techniques herein have been described primarily in the context of a convention, it is to be appreciated that this is only an exemplary use case and that the techniques may be adapted for use in any number of different environments.

In addition, the techniques herein may be used as a standalone system, or may be integrated into functionality of other systems and/or applications. For instance, one specifically contemplated integration of the techniques herein is to use an Internet of Things (IoT) integrated developer environment (IDE) system, which provides both a logical view of the environment (e.g., what devices are present and their logical connectivity), as well as a physical view or "map view" of the application (e.g., where are the devices within a virtualized representation of a physical location). An example IoT IDE with a map view is shown and described in commonly owned, U.S. Provisional Appl. No. 62/172,466, filed on Jun. 8, 2015 for PHYSICAL SPACE MAP OVERLAY AND INTERACTION FOR INTERNET OF THINGS INTEGRATED DEVELOPER ENVIRONMENT, by Wee, et al., the contents of which are hereby incorporated by reference in their entirety.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    detecting, by a computer, that a respective user device for one or more particular users has entered a particular physical space;
    registering, by the computer, the respective user device for the one or more particular users at the particular physical space;
    associating, by the computer, each of the one or more particular users with a respective user profile;
    monitoring, by the computer, a location of each of the particular users within the particular physical space based on a corresponding location of the respective user device, wherein monitoring includes:
        limiting monitoring within certain areas of the particular physical space, wherein the particular users are not tracked in the certain areas if the particular users are within a predefined range of a blackout area;
    receiving, by the computer, a search query for a particular type of user within the particular physical space;
    determining, by the computer, one or more resultant users that correspond to the particular type of user based on the associated respective user profiles;
    determining, by the computer, a location of the one or more resultant users;
    determining, by the computer, utilization of areas within the particular physical space based on the monitoring; and
    displaying, on a graphical user interface (GUI), the location of the one or more resultant users on a virtualized map of the particular physical space, wherein the location of the one or more resultant users within certain areas of the physical space are not displayed on a virtualized map.

2. The method as in claim 1, further comprising:
    displaying information regarding the one or more resultant users on the GUI.

3. The method as in claim 2, wherein the information is selected from a group consisting of: a user name; a user profile; a user picture; and a user availability.

4. The method as in claim 1, wherein the particular type of user queried is based on a type selected from a group consisting of: a skill set; a knowledge base; an experience level; an expertise; a job; a position; a company; a provided service; and a price rate.

5. The method as in claim 1, wherein the particular type of user queried is based on a specific identity of one or more users.

6. The method as in claim 1, wherein the particular type of user queried comprises all registered users within the physical space.

7. The method as in claim 1, wherein monitoring comprises:
    communicating with location-based services of one or more respective registered user devices to determine a physical location of the one or more respective registered user device.

8. The method as in claim 1, wherein registering one or more user devices occurs at a particular event at the physical space.

9. The method as in claim 1, wherein associating one or more of the particular users is based on attendance of the respective user at a previous event.

10. The method as in claim 1, wherein registering and associating occur based on QR-code scanning by one or more particular user devices.

11. The method as in claim 1, further comprising:
    identifying one or more of the user devices based on a media access control (MAC) address.

12. The method as in claim 1, further comprising:
    limiting monitoring based on a user-defined level of detectability.

13. The method as in claim 1, further comprising:
   determining traversed paths of one or particular users within the particular physical space based on the monitoring.

14. The method as in claim 1, wherein the user devices are selected from a group consisting of: a phone; a tablet; a laptop; and a radio frequency identification (RFID) tag.

15. A tangible, non-transitory computer-readable media comprising program instructions, which when executed on a processor are configured to:
   detect that a respective user device for one or more particular users has entered a particular physical space;
   register the respective user device for the one or more particular users at the particular physical space;
   associate each of the one or more particular users with a respective user profile;
   monitor a location of each of the particular users within the particular physical space based on a corresponding location of the respective user device, wherein monitoring includes:
      limiting monitoring within certain areas of the particular physical space, wherein the particular users are not tracked in the certain areas if the particular users are within a predefined range of a blackout area;
   receive a search query for a particular type of user within the particular physical space;
   determine one or more resultant users that correspond to the particular type of user based on the associated respective user profiles;
   determine a location of the one or more resultant users;
   determine utilization of areas within the particular physical space based on the monitoring; and
   display, on a graphical user interface (GUI), the location of the one or more resultant users on a virtualized map of the particular physical space, wherein the location of the one or more resultant users within certain areas of the physical space are not displayed on a virtualized map.

16. The computer-readable media as in claim 15, wherein the program instructions when executed are further configured to:
   display information regarding the one or more resultant users on the GUI.

17. The computer-readable media as in claim 15, wherein the particular type of user queried is based on a type selected from a group consisting of: a skill set; a knowledge base; an experience level; an expertise; a job; a position; a company; a provided service; a price rate; a specific identity of one or more users; and all registered users within the physical space.

18. An apparatus, comprising:
   a processor adapted to execute one or more processes; and
   a memory configured to store a process executable by the processor, the process when executed operable to:
      detect that a respective user device for one or more particular users has entered a particular physical space;
      register the respective user device for the one or more particular users at the particular physical space;
      register a respective user device for one or more particular users at a particular physical space;
      associate each of the one or more particular users with a respective user profile;
      monitor a location of each of the particular users within the particular physical space based on a corresponding location of the respective user device, wherein monitoring includes:
         limiting monitoring within certain areas of the particular physical space wherein the particular users are not tracked in the certain areas if the particular users are within a predefined range of a blackout area;
      receive a search query for a particular type of user within the particular physical space;
      determine one or more resultant users that correspond to the particular type of user based on the associated respective user profiles;
      determine a location of the one or more resultant users;
      determine utilization of areas within the particular physical space based on the monitoring; and
      display, on a graphical user interface (GUI), the location of the one or more resultant users on a virtualized map of the particular physical space, wherein the location of the one or more resultant users within certain areas of the physical space are not displayed on a virtualized map.

\* \* \* \* \*